2,990,383
COMPOSITION COMPRISING AN EPOXY RESIN,
AN AMINO POLYAMIDE AND A POLYAMINE
David Glaser, St. Paul, Minn., assignor to General
Mills, Inc., a corporation of Delaware
No Drawing. Filed Jan. 30, 1956, Ser. No. 561,989
4 Claims. (Cl. 260—18)

This invention relates to new and novel compositions of matter useful as protective coatings which are "100% solids." More particularly, this invention relates to compositions containing amino-polyamide resins, fatty polyamines, and epoxy resins.

A protective coating which has a satisfactory viscosity for brushing at room temperature and/or spraying at room temperature or elevated temperatures and which is composed of 100% solids has long been the goal of workers in this field. Good durability, corrosion resistance, chemical resistance, decorative appearance and an economical price are other desirable characteristics of this type of coating. Various 100% solids protective coatings have been proposed and have achieved limited acceptance. For the most part, however, these coatings have one or more of the disadvantages of being brittle, requiring dangerous catalysts containing toxic ingredients and/or require heat for application. The compositions of this invention overcome these disadvantages for the most part and have advantages heretofore unobtainable. One principal advantage of these compositions is that they require no oxygen penetration in order to cure properly or for the removal of solvent. Another advantage to these compositions is that they may be applied as coatings of varying degrees of thickness. Heretofore, protective coatings have been limited to a film thickness per coat of not more than about 5 mils, whereas the compositions of this invention have been applied in single coats of up to 27 mils thickness. In addition they are thermosetting products having low shrinkage on cure plus a high degree of chemical and solvent resistance.

An object of this invention is to disclose novel compositions which are easy and safe to apply and handle as protective coatings.

Another object is to teach compositions that are 100% solids protective coatings.

Still further advantages and objects of this invention will become apparent from the subsequent detailed description.

It has now been discovered that mixtures of (a) amino-polyamide resins derived from polymeric fat acid and an excess of polyamines, (b) polyamines of the general formula $R(NHR')_xNH_2$ where R is an aliphatic hydrocarbon radical containing 8 to 22 carbon atoms and R' is an alkylene radical and x is an integer less than 6, and (c) epoxy resins containing terminal epoxy groups, have the aforementioned advantages.

The amino-polyamide resins useful in the above compositions are those in which an excess of polyamide is employed in their preparation which results in a polyamide having unreacted amino groups. The amount of these unreacted amino groups can be measured by determining the amine number, the amine number being the number of milligrams of KOH equivalent to the free amine groups in a one gram sample of the resin. Generally speaking, the amino-polyamide resins employed in this invention should have an amine number in the range of 200 to 400 with a preferred range of from 275 to 325.

The polymeric fat acids employed in preparing the amino-polyamide resins are those resulting from the polymerization of drying or semi-drying oils, or their free acids or the simple aliphatic alcohol ester of these acids. Suitable drying or semi-drying oils include soybean, linseed, tung, perilla, cottonseed, corn, sun flower, safflower, and dehydrated castor. Suitable fatty acids may also be obtained from tall oil, soapstock and other similar material. In the polymerization process for the preparation of the polymeric fat acids the fatty acids with sufficient double bond functionality combine for the most part, probably by a Diels-Alder mechanism, to provide a mixture of dibasic and higher polymeric fat acids. These acids are often referred to as dimers, trimers, etc. In place of this method of polymerizatioin, any other method of polymerization may be employed whether the resultant polymer possesses residual unsaturation or not. Thus, the term "polymeric fat acids" as used herein is intended to include the polymerized mixture of acids, which usually contain a predominant portion of dimer acids, a small quantity of trimer and higher polymeric fat acids and some residual monomer.

The polyamides employed to react with the above described polymeric fat acids in the preparation of the amino-polyamide resins have the general formula $$HNR''(NHR'')_nNH_2$$

where R'' is an alkylene radical and n is a whole integer less than 6. Illustrative polybasic amines are diethylenetriamine, triethylenetetramine, tetraethylenepentamine, di-1,3-propanetriamine, tri-1,3-propanetetramine, di-1,2-propanetriamine, and the like. Thus, the alkylene radical in the above formula is generally ethylene but should not be limited thereto.

It will be seen that in order to obtain an amino-polyamide resin of the type employed in this invention, having free and unreacted amino radicals, it is necessary to employ polyamines that are at least trifunctional amines and, generally speaking, at least two amine groups in each molecule will be tied up in the amide linkages. When one of the two amine groups that react to form the amide is a secondary amine, at least one of the terminal primary amines will be free in the form of a branched chain in contrast to a linear amino-polyamide resulting from the reaction of both primary amine groups to form the amide linkages. Under normal conditions the polybasic amine will react with the polymeric fat acids to form a random mixture of branched and linear type linkages.

The epoxy resins (glycidyl polyethers) employed in this invention are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily available commercial products.

Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis (p-hydroxy phenyl) propane (Bisphenol A), the resin having the following theoretical structural formula

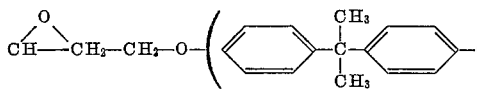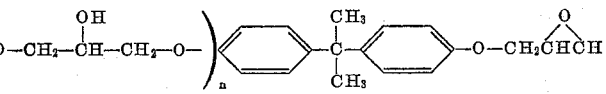

where n is 0 or an integer up to 10. Generally speaking, n will be no greater than 2 or 3 and is preferably 1 or less.

Epoxy resins may be characterized further by reference to their epoxy equivalent, the epoxy equivalent of pure epoxy resins being the mean molecular weight of the resin divided by the mean number of epoxy radicals per molecule, or in any case the number of grams of epoxy resin equivalent to one mole of the epoxy group or one gram-equivalent of epoxide. Epoxy resins having an epoxy equivalent of 140 to 300 or less are suitable for use in this invention, the preferred range being 140 to 200.

The polyamines employed in admixture with the polyamide resins and epoxy resins have the general formula $R(NHR')_xNH_2$ where R is an aliphatic hydrocarbon radical containing from 8 to 20 carbon atoms, R' is an alkylene radical containing less than 5 carbon atoms and $x$ is an integer less than 6. The alkylene radical R' is preferably propylene.

Typical polyamines of this type may be prepared by the addition of acrylonitrile to fatty amines and subsequently reducing the nitrile formed to the corresponding diamine. This reaction is as follows,

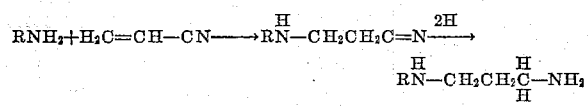

where R is an aliphatic hydrocarbon having from 8 to 22 carbon atoms.

The fatty amine employed in the above reaction can be prepared by the reaction of ammonia with fatty acids to form the fatty nitrile and subsequent reduction of the nitrile to the corresponding fatty amine. The procedures and conditions employed in the above reactions are well-known and practiced commercially.

The fatty acids used to prepare the fatty amine are generally derived from naturally occurring vegetable and animal fats and oils and will have 8 to 22 carbon atoms with a preponderance of the acids containing 18 carbon atoms. Illustrative vegetable oils are soybean oil, cottonseed oil, coconut oil, palm oil, tung oil, castor oil, etc. Analogous fats and oils derived from animals are exemplified by tallow and greases. Suitable fatty acids may also be derived from tall oil and soapstock. The fatty acids derived from each of these sources are complex mixtures that are not easily separated into the individual acids. For this reason the fatty acids employed to prepare the fatty amines will generally be a mixture. One method of classifying acid mixtures derived from the various oils and other sources is by their iodine number. The iodine number is an expression of the equivalent number of grams of halogen expressed as iodine which will react with a 100 gram sample. Or in other words it is an indication of the amount of unsaturated fatty acids in the mixture. Common unsaturated acids are oleic, eleostearic, dehydrated ricinoleic, linoleic, linolenic, and ricinoleic acids. Common saturated acids are stearic, palmitic and lauric acid. For the purposes of this invention it is preferable to use unsaturated fatty acids or mixtures containing a high proportion of unsaturated fatty acids having an iodine number greater than 110 and less than 200. This type of acid mixture may be obtained from an oil such as soybean oil, cottonseed oil, tung oil and other oil having a high iodine number or by separating the saturated fatty acids from the unsaturated fatty acids by distillation or crystallization. Thus, the aliphatic hydrocarbon radical, R, shown in the above reaction will vary according to the fatty acid used to prepare the fatty amines.

This invention may be illustrated further by reference to the following examples. In these examples all "parts" are expressed as parts by weight unless otherwise specified.

EXAMPLE I

A coating composition having a viscosity of R on the Gardner-Holdt scale was prepared by mixing 60 parts of epoxy resin A, a reaction product of 2,2-bis(p-hydroxy phenyl)propane (Bisphenol A) and epichlorohydrin having an epoxy equivalency of 185, 20 parts of an amino-polyamide having an amine number of 309 prepared by reacting polymeric fat acids, tetraethylene pentamine, and triethylene tetramine and 20 parts of a fatty aminopropyl amine, having an iodine number of 90, prepared from soybean fatty acids. Upon standing 2 hours the composition had a viscosity of W–X on the Gardner-Holdt scale. Results from the testing of this composition as 5 mil thick coatings on panels under various conditions were as follows:

*Hardness—Sward—glass panels*

Room temperature curing (77° F.):
```
1 day _____ 16
7 days _____ 40
1 day in vacuum followed by 6 days without
  vacuum _____ 72
```
Heated at 100° F. for 1 day _____ 36
```
Same sample after standing at room temperature
  (77° F.) for additional 6 days _____ 40
```
Heated at 300° F. for 15 minutes _____ 30

*Impact resistance*

```
                                          Inch lbs.
Original impact resistance (steel panels) _____ 100–172
Impact resistance after 118 hours in Twin Arc
  Model DL-TS Weather-Ometer _____   30–60
```

Both the room temperature cured panels and baked panels remained hard after immersion in boiling water for 7 hours, and overnight immersion in mineral spirits, 20% NaOH, 37% $H_2SO_4$ and Skydrol 7000.

EXAMPLE II

A composition identical to that of Example I was prepared with the exception that a fatty amino-propylamine having an iodine number of 60 was used. This composition had a viscosity of U+ after mixing.

A glass panel coated with a 5 mil thick coating of this composition had a hardness (Sward) of 32 after one day at 100° F. Upon standing at room temperature (77° F.) for 6 more days the hardness (Sward) was 46. A similar coating on a steel panel (20 gauge) had an impact resistance of 100–172 inch pounds originally and an impact resistance of 30–60 after 118 hours in the Weather-Ometer.

This coating remained hard after immersion in boiling water for 7 hours and immersion overnight in mineral spirits and Skydrol 7000.

EXAMPLE III

A composition identical to that of Example I was prepared with exception that the fatty amino-propyl amine had an iodine number of 40.

A 1.5 mil coating of this composition had a dust free drying time of 190 minutes and was tack free in less than 22 hours.

Samples cured at room temperature for 1 day and baked for 15 minutes at 300° F. had a Sward hardness of 16 and 38, respectively. The impact resistance in inch pounds of this coating on 31 gauge tinplate after baking was more than 60 and was also more than 60 for another panel which had been cured at room temperature for 7 days. This coating also showed good resistance to 1 day immersions in mineral spirits, 20% NaOH, 37% $H_2SO_4$ and Skydrol 7000.

EXAMPLE IV

A 1.5 mil coating on a glass panel of the composition of Example I had a dust free drying time of 150 minutes and a tack free drying time of less than 22 hours.

The characteristics of this 1.5 mil coating were similar to those shown for the 5 mil coatings of Example I.

EXAMPLE V

The composition of Example II had a dust free drying time of 175 minutes when applied as a 1.5 mil coating on glass and steel panels. These panels had a tack free drying time of less than 22 hours and demonstrated similar hardness, resistance to impact and resistance to chemicals as the 5 mil coatings of Example II.

EXAMPLE VI

A composition using the same ingredients as Example I was prepared by mixing 70 parts of epoxy resin A, 15 parts of the amino-polyamide and 15 parts of fatty amino-propylamine. This composition with a viscosity of S-T on the Gardner-Holdt scale had a dust free drying time for 1.5 mil coating of 150 minutes and a tack free time of less than 22 hours. The Sward hardness of this composition was 50 for a panel baked 15 minutes at 300° F., 18 after curing at room temperature for 1 day, and 36 after curing at room temperature for 7 days. The impact resistance in inch pounds for each of these coatings was greater than 60 for a tin panel.

EXAMPLE VII

A composition having the same ingredients as Example II was prepared using 60 parts of epoxy resin A, 30 of the aminopolyamide and 10 parts of the fatty propyl amine.

This composition with a viscosity of X on the Gardner-Holdt scale had a dust free drying time of 150 minutes for 1.5 mil coatings and was tack free in less than 22 hours.

Coatings baked for 15 minutes at 300° F. had a Sward hardness of 58 and an impact resistance in inch pounds greater than 60 on a tin plate panel.

EXAMPLE VIII 60 parts of epoxy resin B (Araldite 502) a reaction product of Bisphenol A and epichlorohydrin, having an epoxy equivalency in the range of 180–200, 25 parts of an amino-polyamide prepared from polymeric fat acids and an excess of a mixture of diethylene triamine and triethylene tetramine, having an amine number of 330, and 15 parts of a fatty amino-propyl amine, having an iodine number of 90, were mixed together. Coatings from this composition had a high impact resistance and were resistant to attack by various chemicals.

EXAMPLE IX 60 parts of epoxy resin B, 20 parts of an amino-polyamide derived from polymeric fat acids and an excess of a mixture of tetraethylene pentamine and triethylene tetramine having an amine number of 309 and 20 parts of a fatty amino-propylamine having an iodine number of 90 were mixed together and had a viscosity of W-X on the Gardner-Holdt scale. After standing for 2 hours the mixture had a viscosity of $Z_5$.

A 1.5 coating on a steel panel of this mixture had a dust free drying time of 150–270 minutes and a tack free drying time of less than 22 hours.

Likewise, when baked for 15 minutes at 300° F. as a 1.5 mil coating had a Sward hardness of 28 and an impact resistance of more than 60 inch pounds on tin plate.

EXAMPLE X

A composition containing the same ingredients as Example IX, in the ratio of 70 parts epoxy resin B, 15 parts amino-polyamide, and 15 parts fatty amino-propylamine had a viscosity of X.

This composition had a dust free drying time of 150–270 minutes and a tack free drying time of less than 22 hours on a glass panel.

The Sward hardness for a 1.5 mil coating of this composition on a glass panel after being baked for 15 minutes at 300° F. was 48.

Room temperature cured and baked coatings with this composition had an impact resistance of more than 60 inch pounds on tin plate.

EXAMPLE XI

A composition containing the same ingredients as Example IX in the ratio of 80 parts epoxy resin B, 10 parts fatty amino-propylamine, and 10 parts amino-polyamide had a viscosity of Y-Z. A 1.5 mil coating of this composition on a glass panel had a dust free drying time of 270 minutes and a tack free drying time in excess of 48 hours.

EXAMPLE XII

A composition containing the same ingredients as Example IX was prepared using 60 parts of epoxy resin B, 25 parts of the amino-polyamide, and 15 parts of the fatty amino-propyl amine and had a viscosity of Y-Z. Upon baking at 300° F. for 15 minutes, a 1.5 mil coating of this composition had a Sward hardness of 46 on glass and an impact resistance greater than 60 inch pounds on tin plate. Another panel cured at room temperature for 7 days also had an impact resistance greater than 60 inch pounds.

EXAMPLE XIII

A composition was prepared using the same ingredients and proportions as Example XII except that 15 parts of a fatty amino-propyl amine were used. This composition had a viscosity of Y-Z, a dust free drying time of 150 minutes, and a tack free drying time of less than 22 hours. Upon baking at 300° F. for 15 minutes this composition had a Sward hardness of 52 and an impact resistance greater than 60 inch pounds on tin plate.

EXAMPLE XIV 27.5 parts of an amino-polyamide having an amine number of 309 prepared by reacting polymeric fat acids and an excess of a mixture of triethylene tetramine and tetraethylene pentamine, 27.5 parts of a fatty amino-propylamine, having an iodine number of 60, and 45 parts of epoxy resin C, a reaction product of Bisphenol A and epichlorohydrin, having epoxy equivalency of approximately 150 (Epon 562) were mixed to produce a composition having a viscosity of N on the Gardner-Holdt scale. After standing 2 hours at room temperature the mixture had gelled.

A 1.5 mil. coating of this composition on a glass panel had a dust free drying time of 120–150 minutes after a tack free drying time greater than 96 hours. After separate panels were baked at 300° F. for 15 minutes and cured at room temperature for one day, they each had a Sward hardness less than 5. This composition baked on a tin panel had an impact resistance greater than 60 inch pounds.

EXAMPLE XV 10 parts medium chrome yellow pigment and 2 parts of a yield value agent (Nuvis #2) were added to 100 parts of the coating composition of Example I. This lightly pigmented coating composition did not sag even when applied very thick and dried on a vertical surface. This mixture also cured while immersed in salt water to a hard film comparable to an air-dried film except that it had lost part of its gloss.

From the above examples it will be observed that the proportions of the various ingredients of the novel compositions of this invention may vary within a wide range and are governed primarily by the degree of reactivity of the individual components. Generally speaking, the compositions should contain from 50 to 75% by weight epoxy resin, 10 to 30% by weight amino-polyamide, and 5 to 30% by weight fatty polyamine.

EXAMPLE XVI 60 parts epoxy resin (D) prepared from Bisphenol A and epichlorohydrin having an epoxy equivalency of 180, 20 parts of an amino-polyamide having an amine number of 309 prepared by reacting polymeric fat acids and an excess of a mixture of triethylene tetramine and tetraethylenepentamine, and 20 parts of

were mixed to produce a composition having a viscosity of T–U on Gardner-Holdt scale and which dried on a glass panel tack-free in less than 22 hours to a Sward hardness of 26. This coating had good resistance to one day immersion in oleic acid and Skydrol 500.

EXAMPLE XVII

The ingredients of Example XVI were mixed in the following proportions; 70 parts epoxy resin (D), 15 parts of the amino-polyamide and 15 parts of $$C_{12}H_{25}NHC_2H_4NHC_2H_4NH_2$$

This mixture had a viscosity of V on the Gardner-Holdt scale. A coating of this composition on a glass panel had a Sward hardness of 35.

The compositions of this invention have a sufficiently low viscosity to be applied by hand brushing or by hot spraying at 180° F. or below. As such they may be employed in the same manner and applications as ordinary paints and varnishes. They will be especially advantageous for painting in enclosed spaces such as drums, tanks, the interior of pipes and tubing, and even in a vacuum. Their use as lightly-pigmented paints for curing under salt water has many applications in the field of marine coatings. They are also useful as adherent coatings on printed wiring, where they not only serve as coatings but also help hold the wiring firmly to the supporting board. Whatever their field of application, it has been demonstrated that the compositions encompassed by this invention may be applied as protective coatings that are thick, durable, highly resistant and attractive in appearance. They show little or no shrinkage or change in volume as a result of loss of volatile matter or change in specific gravity on curing. However, many modifications and variations of the invention as hereinbefore set forth may be made without departing from the spirit and scope thereof and therefore only such limitations should be imposed as are indicated in the appended claims.

Now, therefore, I claim:

1. Compositions of matter comprised of 50 to 75% by weight of an epoxy resin derived from epichlorohydrin and 2,2-bis (p-hydroxy phenyl) propane, having an epoxy equivalency of from 140 to 300, from 10 to 30% by weight of an amino polyamide prepared from polymeric fat acids and an excess of a polyamine of the general formula $H_2NR''(NHR'')_nNH_2$ where $R''$ is an alkylene radical and $n$ is a whole integer less than 6, the amino polyamide having an amine number in the range of 200 to 400 and 5 to 30% by weight of a polyamine of the general formula $R(NH[R']_y)_xNH_2$ where R is a hydrocarbon radical containing 8 to 22 carbon atoms, $R'$ is a methylene radical, $y$ is from 2 to 3 and $x$ is a whole integer less than 6.

2. The compositions of claim 1 in which $y$ is 3 and $x$ is 1.

3. A composition of matter consisting essentially of 50 to 75% by weight of an epoxy resin prepared from epichlorohydrin and 2,2-bis (p-hydroxy phenyl) propane, having an epoxy resin equivalency of 140 to 300, 10 to 30% by weight of an amino-polyamide prepared from polymeric fat acids and an excess of a polyamine selected from the group consisting of diethylene triamine, triethylene tetramine, and tetraethylene pentamine, the amino polyamide having an amine number in the range of 200 to 400, and 5 to 30% by weight of a fatty aminopropyl amine having the formula $RNH(CH_2)_3NH_2$ in which R is a hydrocarbon radical containing 8–22 carbon atoms, said fatty aminopropyl amine having an iodine number in the range of 40 to 100.

4. The compositions of claim 1 in which $R''$ is an ethylene radical.

References Cited in the file of this patent

UNITED STATES PATENTS

| | | |
|---|---|---|
| 2,450,940 | Cowan et al. | Oct. 12, 1948 |
| 2,589,245 | Greenlee | Mar. 18, 1952 |
| 2,698,315 | Greenlee | Dec. 28, 1954 |
| 2,705,223 | Renfrew et al. | Mar. 29, 1955 |
| 2,707,708 | Witcoff | May 3, 1955 |
| 2,712,535 | Fisch | July 5, 1955 |
| 2,735,829 | Wiles et al. | Feb. 21, 1956 |
| 2,760,944 | Greenlee | Aug. 28, 1956 |
| 2,839,480 | Ott et al. | June 17, 1958 |
| 2,880,194 | Glaser | Mar. 31, 1959 |

OTHER REFERENCES

Silver et al.—"Epoxy Resins in Glass Cloth Laminates," Modern Plastics, November 1950, pages 113–114, 116 and 118.